Patented Mar. 3, 1953

2,630,423

UNITED STATES PATENT OFFICE 2,630,423

N-CARBOANHYDRIDES AND POLYAMIDES

Robert Neal MacDonald, New Castle, and Charles William Tullock, Wilmington, Del., assignors to E. I. du Pont de Nemours & Company, Wilmington, Del., a corporation of Delaware No Drawing. Application January 6, 1950, Serial No. 137,285

8 Claims. (Cl. 260—78)

This invention relates to new condensation polymers. More specifically, it relates to new alpha-amino acid polymers.

While, as pointed out in the copending application of MacDonald Serial No. 778,458, filed August 5, 1947, alpha-amino acid copolyamides of unique solubility properties can be prepared by copolymerizing the N-carboanhydrides of alpha-primary-aminocarboxylic acids containing at least one hydrogen on the alpha-carbon, these alpha-amino acid polyamides are not completely satisfactory for fiber use since they generally exhibit poor response to aqueous processing treatments and are highly resistant to the most commonly used dyes.

Other alpha-amino acid polyamides of unique thermal stability, which make them of interest in the preparation of films, fibers and plastics are disclosed in the copending application of Brubaker and MacDonald Serial No. 64,042, filed December 7, 1948. Although certain of these polyamides containing alpha-secondary amino acid units exhibit somewhat improved dyeability, their preparation in the high molecular weights found to be necessary for optimum film and fiber performance is difficult.

Other alpha-amino acid polyamides which contain appreciable quantities of alpha-secondary-amino acid units are in general more readily dyed but these polyamides are also difficult to obtain in the desired high molecular weight ranges. Furthermore, as pointed out in the copending application of MacDonald and Schreiber, Serial No. 110,024, filed August 12, 1949, it is necessary that a careful balance be maintained in the relative proportions of alpha-primary and alpha-secondary-amino acid units in the polyamides to insure both good dyeability and as good film and fiber properties as possible. In fact, those polyamides containing a preponderance of alpha-secondary-amino acid units are generally too water sensitive for effective use as fibers—being in some instances water soluble.

Finally, as pointed out in the copending application of MacDonald Serial No. 78,223, filed February 24, 1949, the dye receptivity of the alpha-primary-amino acid polyamides can be markedly improved by after-treating them with amide-forming derivatives, e. g. the N-carboanhydrides of selected alpha-secondary-amino acids without appreciably altering their desirable physical properties. However, such a procedure is less desirable in view of the further expense and extra equipment necessary for carrying out the after-treating step.

This invention has as an object the preparation of new alpha-monoaminomonocarboxylic acid polyamides. Another object is the preparation of copolyamides of improved dye receptivity. A further object is the preparation of copolyamides of desirable response to aqueous processing treatments. A still further object is the preparation of new polyamide fibers having desirable properties. Another object is the preparation of new amino acid N-carboanhydrides. Other objects will appear hereinafter.

These objects are accomplished by the invention of N-carboanhydrides of hydrocarbon monocarboxylic acid esters of alpha-mono-primary-aminomonocarboxylic acids which are hydrocarbon except for the amino and carboxyl groups and one alcoholic hydroxyl group situated on carbon separated from the carboxyl by a saturated aliphatic chain preferably of one to four carbons and the polyamides, derived from said carboanhydrides by condensation with carbon dioxide evolution, consisting of alpha-monoaminomonocarboxylic acid units 10 to 100% of which are units corresponding to said hydroxy monoaminocarboxylic acids and/or their esters with hydrocarbon monocarboxylic acids.

The polyamides of this invention can be conveniently prepared by polymerizing the amide-forming derivatives of the desired alpha-monoaminomonocarboxylic acids. Among the known amide-forming derivatives of the alpha-amino acids, it is preferred to use the N-carboanhydrides since they can be conveniently prepared in good yields from readily available materials and are capable of being easily polymerized with evolution of carbon dioxide to high molecular weight film- and fiber-forming alpha-amino acid polyamides.

In polyamides of this invention wherein hydroxy substitutents are desired, it is necessary that the amide-forming derivatives, e. g. the N-carboanhydrides, of the corresponding acyloxy alpha-amino acid units be polymerized with the other alpha-amino acid amide-forming ingredients necessary, if any, to produce the desired polyamide and that the acyloxy radicals be removed from such units by hydrolysis, thereby preparing the corresponding hydroxy units.

The following examples in which the parts given are by weight are submitted to further illustrate and not to limit this invention. As used in these examples inherent viscosity, $\eta_{inh.}$, is defined by the following formula:

$$\eta_{inh.} = ln\frac{\eta_{rel.}}{C}$$

wherein *ln* is the natural, or Napierian, logarithm;

$$\eta_{rel.} = \frac{\eta \text{ solution}}{\eta \text{ solvent}}$$

$\eta$ being viscosity; and C is the concentration of the solute in grams per 100 cc. of solution. The $\eta$ inh. figures given refer to results obtained with the polyamide involved dissolved in m-cresol at 25° C. at a concentration of 0.3 g./100 cc. of solution.

EXAMPLE I

*Part A.—Preparation of epsilon-acetoxy-DL-alpha-amino-n-caproic acid*

To 29 parts of epsilon-hydroxy-DL-alpha-amino-n-caproic acid contained in a reactor fitted with a reflux water condenser is added portionwise 250 parts of acetyl chloride over a period of 30 minutes. During the addition the temperature of the reaction mixture gradually rises and when the acetyl chloride begins to reflux (52° C.), external cooling with ice and water is started. At the end of the addition period the reaction mixture is allowed to cool to room temperature and then let stand over-night. Anhydrous diethyl ether (907 parts) is then added to the reaction mixture and the resulting solid removed by filtration. There is thus obtained 41 parts (95% of theory) of epsilon-acetoxy-DL-alpha-amino-n-caproic acid hydrochloride. This product is twice recrystallized by dissolving in 103–118 parts of absolute ethyl alcohol, adding anhydrous diethyl ether slowly to the cloud point, and cooling the resultant solution in ice and water. The solid product is removed by filtration after each recrystallization. There is thus obtained 27 parts (60.7% yield and 65.8% recovery) of purified epsilon-acetoxy-DL-alpha-amino-n-caproic acid hydrochloride as white crystals, melting at 124.0–125.5° C.

Another sample of the product prepared in a similar fashion gave the following

ANALYSIS

Calculated for $C_8H_{16}O_4NCl$: C, 42.57%; H, 7.10%; N, 6.21%.
Found: C, 42.35%; H, 7.46%; N, 5.98%.

Sixty (60) parts of another sample of epsilon-acetoxy-DL-alpha-amino-n-caproic acid hydrochloride prepared in a similar fashion is dissolved in 238.9 parts of concentrated ammonium hydroxide and the resulting solution filtered. To the filtrate is added 1349 parts of absolute alcohol and the resulting mixture cooled to 0° C. The precipitate so formed is removed by filtration and subsequently slurried with anhydrous ether and finally isolated by filtration. There is thus obtained 24 parts of crude epsilon-acetoxy-DL-alpha-amino-n-caproci acid. This material is dissolved in 200 parts of distilled water and 453 parts of absolute alcohol added to the resulting solution. After cooling to 0° C. and isolating the precipitate so formed by filtration followed by drying, there is obtained 17 parts of pure epsilon - acetoxy - DL - alpha - amino - n - caproic acid as a white, amorphous powder melting at 222–226° C. with decomposition and analyzing for a neutral equivalent, by perchloric acid titration, of 188.5 (theory for $C_8H_{15}O_4N$: N. E. 189.0).

*Part B.—Preparation of epsilon-acetoxy-DL-alpha-amino-n-caproic acid N-carboanhydride*

A suspension of 10 parts of the above epsilon-acetoxy-DL-alpha-amino-n-caproic acid hydrochloride in 258 parts of purified anhydrous dioxane in a reactor fitted with an efficient stirrer, a reflux water condenser and a gas inlet tube, connected to a source of gaseous phosgene and so placed that its lower extremity is just above the surface of the suspension, is treated with gaseous phosgene for 26 minutes while maintaining the temperature of the reaction mixture between 48 and 53° C. at such a rate that an excess of phosgene is added. At the end of this time the dioxane is removed from the clear reaction mixture by distillation at 46–49° C. under 35–50 mm. of mercury pressure over a period of 40 minutes. To the remaining oil there is then added 453 parts of petroleum ether (B. P. 30–60° C.) and the resulting mixture vigorously shaken. The petroleum ether is removed by decantation, 106 parts of anhydrous diethyl ether is added, and the solution filtered to remove small quantities of insoluble oil. Petroleum ether is then added to the filtrate until the cloud point is reached (approximately 16 parts added). Upon cooling in an ice water bath, an oil separates out. Upon further cooling in an acetone/solid carbon dioxide bath, the oil crystallizes. The crystalline precipitate is removed by filtration and subsequently dried. There is thus obtained 6.91 parts (72.4 per cent of theory) of epsilon-acetoxy-DL-alpha-amino-n-caproic acid N-carboanhydride as white crystals melting at 53–55° C. (and evolving gas from the melt at approximately 120–125° C.).

Another sample of the above epsilon-acetoxy-DL-alpha-amino-n-caproic acid N-carboanhydride, which was prepared similarly, after twice being recrystallized from anhydrous diethyl ether is obtained as white crystals melting at 55–56° C. (and evolving gas from the melt at approximately 128° C.).

ANALYSIS

Calculated for $C_9H_{13}O_5N$: C, 50.23%; H, 6.05%; N, 6.51%.
Found: C, 50.25%; H, 6.28%; N, 6.44%.

*Part C.—Preparation of the polyamide from epsilon-acetoxy-DL-alpha-amino-n-caproic acid*

One part of the N-carboanhydride of epsilon-acetoxy-DL-alpha-amino-n-caproic acid, prepared as described above from the corresponding amino acid (obtained from the hydroxy amino acid by reaction with acetyl chloride using glacial acetic acid as a reaction medium) is dissolved in 22 parts of anhydrous chlorobenzene (boiling range at atmospheric pressure 131–132° C., carefully purified by distillation through a 2-foot Raschig packed fractionating column) and the resulting solution heated at atmospheric pressure at 105° C. for four days. The moderately viscous, slightly colored solution thus obtained is poured in a thin film onto a glass plate and the chlorobenzene allowed to evaporate at room temperature. After being dried at 65° C. for one day and removed from the casting surface, there is obtained a clear, strong, self-supporting, elastic, pliable, cold-drawable film of the polyamide from epsilon-acetoxy-DL-alpha-amino-n-caproic acid exhibiting an inherent viscosity of 0.93 and a tenacity of 1475 lb./sq. in. and an elongation of 135% as measured on an Instron tensile tester, which uses a strain gauge as the weighing element. The film is soluble in dioxane, ethyl acetate, chlorobenzene, chloroform, tetrachloroethane, m-cresol, formic acid and liquid ammonia, but insoluble in ethyl alcohol, benzene and diethyl ether. The polyamide melts at 305° C. with decomposition and blackening, as measured on a heated copper block exposed to the atmosphere.

Samples of a similar film are well and deeply dyed with a green vat dyestuff paste of Colour Index Number (CIN) 1101 having approximately an 11% color content, a yellow direct dyestuff powder of CIN 365, a blue acid dyestuff powder of CIN 1076 having approximately a 75% color content and the red dyestuff described in the sole example of Swiss Patent 149,405. Samples of a film prepared similarly from another batch of this polyamide exhibit a water absorption of 3–4% after immersion in water for 24 hours at 25° C.

A sample of epsilon-acetoxy-DL-alpha-amino-n-caproic acid N-carboanhydride, prepared as described in Part B above, after being twice recrystallized from diethyl ether/petroleum ether is polymerized for six days at 130° C. under capillary reflux in tetrachloroethane. The moderately viscous, slightly colored solution thus obtained is poured in a thin film onto a glass plate and the tetrachloroethane allowed to evaporate at room temperature. After being dried and removed from the casting surface, there is obtained a clear, elastic, pliable, self-supporting film of the polyamide from epsilon-acetoxy-DL-alpha-amino-n-caproic acid exhibiting an inherent viscosity of 0.16.

Further samples of this same batch of N-carboanhydride are polymerized in anisole or chlorobenzene at 130° C. for three days under capillary reflux. The moderately viscous, slightly colored solutions thus obtained are poured in thin films onto glass plates and the anisole and chlorobenzene, respectively, allowed to evaporate at room temperature. After being dried and removed from the casting surface, there are obtained clear, elastic, pliable, self-supporting films of the polyamide from epsilon-acetoxy-DL-alpha-amino-n-caproic acid exhibiting an inherent viscosity of 0.44.

*Part D.—Preparation of fibers of the polyamide from epsilon-acetoxy-DL-alpha-amino-n-caproic acid*

Thirteen (13) parts of the polyamide from epsilon-acetoxy-DL-alpha-amino-n-caproic acid of inherent viscosity 0.56 (prepared as first described in Part C above) is dissolved in 52 parts of 100% formic acid by stirring at room temperature for one hour. The resulting solution is pressure filtered through a sintered glass filter and then wet spun into a 5% sodium hydroxide solution at 25° C. through a 23 hole stainless steel spinneret of 0.003" hole diameter at a rate of 1.35 cc. of spinning solution per minute. The fiber travel through the sodium hydroxide bath is 35 inches and the fiber up-take on a Godet wheel is at a rate of 26.5 feet per minute. The fiber is taken up on a windup bobbin from the Godet wheel at such a rate that it is stretched, i. e., drawn, 3:1. The yarn is then washed in running water on the bobbin overnight, dried in air and then further drawn two to one through oil at 230° C. The resulting yarn is then washed with alcohol, dried, wound in skein form and subsequently boiled-off for 45 minutes in a 0.1% aqueous solution of the sodium salt of a fatty alcohol sulfate. The yarn from the polyamide from epsilon-acetoxy-DL-alpha-amino-n-caproic acid exhibits the following properties:

Denier, 66, and a dry tenacity of 1.0 gram/denier (g./d.) and 8% elongation as measured on the incline plane before boil-off; and after boil-off, a denier of 70, a dry tenacity of 1.0 g./d. and 22% elongation, a modulus at 1% elongation of 3 g./d./100%, and a sticking point of 225° C.

Samples of this yarn in skein form after being boiled for 40 minutes in either aqueous 0.2% sodium hydroxide or 2% sodium sulfide solutions are rendered insoluble in both chloroform and water with no significant changes in the physical properties.

*Part E.—Partial hydrolysis of the polyamide from epsilon - acetoxy - DL - apha - amino - n-caproic acid and the formation of films and fibers from the hydrolysis products*

Two (2) parts of the polyamide from epsilon-acetoxy-DL-alpha-amino-n-caproic acid ($\eta_{inh} = 0.56$)

is dissolved in 124 parts of purified anhydrous dioxane and the solution allowed to stand overnight at room temperature. At the end of this time 79 parts of reagent grade methanol is added and the slight amount of insoluble material thus obtained removed by filtration. A solution of 0.2 part of metallic sodium dissolved in 16 parts of reagent methanol is added to the filtrate and the resulting solution heated in a closed stainless steel reactor under autogenous pressure at 120° C. for two hours. The reactor is cooled to room temperature and after standing over-night is opened and 907 parts of anhydrous diethyl ether added to the reaction mixture. The resulting precipitate is removed by filtration, slurried with a mixture of 10 parts of water and 79 parts of methanol, and the insoluble portion removed by filtration. After repeating this slurrying and filtering process and air drying the resulting material, there is obtained 0.9 part of polymeric product. This product is dissolved in 12 parts of 98–100% formic acid, the solution filtered free of scattered, undissolved, small particles, and the filtrate poured in a thin film onto a glass plate. The formic acid solvent is allowed to evaporate at room temperature and the resulting film removed from the casting surface by immersion in water. After drying, there is thus obtained a brilliantly clear film of the partially hydrolyzed polyamide from epsilon-acetoxy-DL-alpha-amino-n-caproic acid, i. e., a copolyamide of epsilon-acetoxy-DL-alpha-amino-n-caproic acid and epsilon-hydroxy-DL-alpha-amino-n-caproic acid.

Samples of this film exhibit an inherent viscosity of 0.29 and analyze for 9.18% nitrogen by the Dumas method. Since in theory the nitrogen content of the polyamide from the acetoxy-amino acid is 8.19% and that of the polyamide from the hydroxyamino acid is 10.85%, the above 9.18% obtained for this polyamide indicates that 37.2% of the acetoxy groups in the parent polyamide from epsilon-acetoxy-DL-alpha-amino-n-caproic acid have been hydrolyzed to hydroxy groups. Expressed another way these analytical results indicate that the polymeric product obtained above corresponds in composition to a co-polyamide from a 37.2/62.8 mixture of epsilon-hydroxy-DL-alpha-amino-n-caproic acid and epsilon-acetoxy-DL-alpha-amino-n-caproic acid, respectively.

This partially hydrolyzed product, i. e., the co-polyamide containing free hydroxy units, is soluble in m-cresol and formic acid, but insoluble in dioxane, chloroform, water at 100° C. and methanol. This polyamide in film form as described above exhibits a tenacity of 3045 lb./sq. in. and 24% elongation, a modulus of stiffness of 104,000 lb./sq. in, a pliability factor $$\left[\frac{10^{-6}}{\text{(modulus of stiffness)}}\right]$$

of 9.6, and a sticking temperature of 265–270° C. A similar sample prepared from another batch of the polyamide of alpha-amino-epsilon-acetoxy-n-caproic acid which on the basis of nitrogen analysis has had 18.8% of its acetoxy groups hydrolyzed to hydroxy groups absorbs 33% by weight of water after being immersed in water at 25° C. for 24 hours.

Film samples of such partially hydrolyzed polyamides exhibit improved dye receptivity over the unhydrolyzed controls for such typical dyes as a red acid dyestuff powder of CIN 430 having approximately an 80% color content, the blue dyestuff obtainable according to the procedure of Example IX of U. S. Patent 2,050,704, and the red dyestuff described in the sole example of Swiss Patent 149,405.

A sample similarly prepared from another batch of the polyamide from epsilon-acetoxy-DL-alpha-amino-n-caproic acid of inherent viscosity 0.69, except that the hydrolysis was carried out for two hours in an open vessel fitted with a reflux condenser at the refluxing temperature of the dioxane/methanol mixture, exhibits in film form (as obtained from formic acid solution) an inherent viscosity of 0.51, a sticking temperature of 265–270° C., and an average nitrogen content by the Dumas method of 9.08% corresponding to the conversion of 33.4% of the original acetoxy groups to hydroxy groups.

A 20% solids solution of this latter polyamide in 98–100% formic acid is spun into a 5% sodium hydroxide solution at 25° C. through a 34 hole stainless steel spinneret of 0.003 inch, i. e., 3 mils, hole diameter at the rate of 1.6 mls. of spinning solution per minute. The fiber travel in the coagulating bath is 35 inches and the pickup from the coagulating bath on a Godet wheel is at a rate of 22 feet per minute. The fiber is taken up on a wind-up bobbin from the Godet wheel at a rate of 23.5 feet per minute thus giving the yarn a 1.07:1 stretch. The yarn is then washed in running water on the bobbin for approximately 15 hours and then further drawn at a ratio of 5.1:1 while wet, subsequently dried directly on the wind-up bobbin and then wound in skein form. The yarn skeins are subsequently boiled for 45 minutes in a 0.1% aqueous solution of the sodium salt of a fatty-oil sulfate (during which time the yarn stretches 22.5%), the yarn exhibits the following properties:

Denier, 153
Dry tenacity, 0.3 g./d. and 48% elongation (as measured on the Instron tensile tester)
A modulus at 1% elongation of 4.4 g./d./100%

Another sample of this yarn spun in a similar fashion to that described above except that the spinning solution is admitted to the spinneret at a rate of 1.9 ml. per minute, after being stretched 1.07:1 and washed on the bobbin in running water for approximately 15 hours as described above, is further drawn at a ratio of 4:1 at 230–235° C. in a mineral oil bath using a 14 inch yarn travel in the bath. After being wound in skein form and boiled-off as described above, the yarn exhibits the following properties:

Denier, 168
Dry tenacity, 0.27 g./d. and 26% elongation (as measured on the Instron machine)
A modulus of 4.7 g./d./100%

*Part F.* — *Complete hydrolysis of the polyamide from epsilon - acetoxy - DL - alpha - amino-n-caproic acid and the formation of films from the hydrolysis product*

Two (2) parts of the polyamide from epsilon-acetoxy-DL-alpha-amino-n-caproic acid [prepared as described previously in Part C except that the polymerization was carried out for 143 hours at 105° C.] of inherent viscosity 0.58 is dissolved in 103 parts of reagent grade dioxane in a glass reactor. A solution of 0.3 part of freshly scraped metallic sodium in 59 parts of reagent grade methanol is added and the reaction mixture heated under reflux on a steam bath for one hour. At the end of this time, the reaction mixture is poured slowly into 453 parts of anhydrous diethyl ether and the resulting precipitate then separated by filtration. This solid product is then suspended in about 40 parts of water, filtered slowly, and then allowed to dry. There is thus obtained the completely hydrolyzed polyamide from epsilon-acetoxy-DL-alpha-amino-n-caproic acid (i. e., the polyamide from epsilon-hydroxy-DL-alpha-amino-n-caproic acid) as a white solid, soluble in m-cresol, ethylene glycol at the B. P., and formic acid at 100° C. but insoluble in dioxane, N,N-dimethyl formamide, and ethyl acetate, all at 100° C., and in benzene, ethyl alcohol, and benzene/acetone mixtures, all at the B. P. This polymer exhibits an inherent viscosity of 0.42 and contains 10.52% nitrogen as determined by the Kjeldahl procedure. The theoretical nitrogen content for the completely hydrolyzed polyamide is 10.85%.

A sample of this polyamide is dissolved in m-cresol by letting stand at room temperature over-night, followed by warming for 15 minutes on a steam bath. The resulting solution is filtered and then poured in a thin film onto a glass plate. The m-cresol is allowed to evaporate slowly at room temperature and finally further removed by heating at 70° C. under reduced pressure for 3.5 hours. The glass plate and the film thereupon cast are finally immersed in four different batches of ethyl alcohol and allowed to stand for a total exposure time of nine hours to remove final traces of the cresol. The film is removed from the casting surface and dried. It is found to soften at 230–240° C., and to be almost completely soluble in water but insoluble in chloroform and dioxane.

Upon analysis of the infrared spectrum of samples of this film, it is found that there is no absorption in the portion of the spectrum characteristic for ester carbonyl groups, although there is definite and strong absorption in this region in the infrared spectrum from film samples of the polyamide before hydrolysis. The infrared spectrum of the hydrolyzed film also indicates that no m-cresol is present and exhibits an extra absorption in the 3.0$\mu$ region, which would be expected when hydroxyl groups are present.

*Part G.—Limited hydrolysis of the polyamide from epsilon-acetoxy-DL-alpha-amino-n-caproic acid and the formation of films from the hydrolysis product*

Three (3) parts of the polyamide from epsilon-acetoxy-DL-alpha-amino-n-caproic acid [described previously in Part F], of inherent viscosity of 0.58, and 0.5 part of ammonium chloride are placed in a stainless steel pressure vessel. The vessel is closed and connected to a source of ammonia under pressure. The pressure vessel is cooled in a solid carbon dioxide/methanol bath and ammonia pressured in until approximately 123 parts is added. The vessel is then sealed and heated at 70° C. for two hours under autogenous pressure. The bomb is then allowed to cool to room temperature, and after standing overnight, the excess ammonia is bled to the atmosphere. The solid product is suspended in 50 parts of water, and after stirring for ten minutes, is removed by filtration. The resulting solid is again suspended in 50 parts of water and the mixture warmed to 45° C. for ten minutes and then filtered. After air drying overnight, there is obtained 3.2 parts of the slightly hydrolyzed polyamide from epsilon-acetoxy-DL-alpha-amino-n-caproic acid. A portion of this polymer is dissolved in formic acid and the resulting solution poured in a thin film onto a glass plate. After allowing the formic acid to evaporate at room temperature, the resulting film is removed from the casting surface. Samples of this film exhibit the following properties: an average tenacity of 2100 lb./sq. in. and an elongation of 55%, an average pliability factor of 21, and an average modulus of stiffness of 47,500 lb./sq. in.

The polyamide is also soluble in chloroform and m-cresol and in the latter solvent exhibits an inherent viscosity of 0.35. The polyamide is found to contain an average of 8.42% nitrogen (Kjeldahl). Since the theoretical nitrogen content for the completely hydrolyzed polyamide is 10.85% and that for the unhydrolyzed starting polyamide is 8.19%, these analytical figures indicate that approximately 8.65% of the acetoxy groups have been removed by hydrolysis, i. e., this slightly hydrolyzed polyamide corresponds to a copolyamide from an 8.65/91.35 mixture of epsilon-hydroxy-DL-alpha-amino-n-caproic acid/epsilon-acetoxy-DL-alpha-amino-n-caproic acid.

*Part H.—Preparation of DL-leucine/epsilon-acetoxy-DL-alpha-amino-n-caproic acid copolyamides*

A solution of 0.5 part of the N-carboanhydride of DL-leucine (prepared as described in the copending application of Cleaver and Schreiber, Serial No. 78,022, filed February 16, 1949) and 1.5 parts of the above (see Example I, Part B) N-carboanhydride of epsilon-acetoxy-DL-alpha-amino-n-caproic acid in 66 parts of freshly distilled (B. P. 132° C./760 mm.) chlorobenzene is warmed gently on a hot plate and filtered under anhydrous conditions into a glass reactor which is then fitted with a small capillary entry. The reactor and its contents are heated at atmospheric pressure at 65° C. for 173 hours and then for 24 hours at 115° C. The polymerization solution is then poured in a thin film onto a glass plate and the chlorobenzene allowed to evaporate. After heating slightly to remove last traces of chlorobenzene, there is obtained a clear, attractive, strong, self-supporting film of the copolyamide from a 1:3 by weight mixture of the N-carboanhydrides of DL-leucine and epsilon-acetoxy-DL-alpha-amino-n-caproic acid exhibiting an inherent viscosity of 0.45. Further samples of this copolyamide are dissolved in chloroform and the resulting solution poured in a thin film onto a glass plate and the chloroform allowed to evaporate at room temperature. The clear, pliable, strong film thus obtained is soluble in benzene, dioxane, anisole and formic acid, exhibits a zero strength temperature of 222° C. and melts with decomposition at 290° C. These film samples exhibit an average tensile strength of 1102 lb./sq. in. and 71% elongation, an average pliability factor of 36.3 and an average modulus of 27,900 lb./sq. in. as measured on an Instron fiber and film testing machine.

A similar copolyamide prepared in an identical fashion from equal parts of the same batches of the respective N-carboanhydrides exhibits an inherent viscosity of 0.46, a zero strength temperature of 270° C. and a melting point of 350° C. with decomposition and an average tensile strength of 7175 lb./sq. in. and 19.5% elongation, an average pliability of 4.3, and an average modulus of 231,600 lb./sq. in. as given in the above-mentioned conditions.

Another copolyamide prepared under similar conditions from a mixture of 1.5 part and 0.5 part, respectively, of further samples of the same batches of the N-carboanhydrides of DL-leucine and epsilon-acetoxy-DL-alpha-amino-n-caproic acid varying only in that polymerization is carried out at 65° C. for 172½ hours at 65° C. exhibits an inherent viscosity of 0.31; a melting point, with decomposition, of 385° C.; the same solubilities, except that the various solutions of this copolyamide are the most viscous of the three copolyamides; and an average tensile strength of 5024 lb./sq. in. and 9.5% elongation, an average pliability of 5.2, and an average modulus of 190,500 lb./sq. in.

*Part I.—Hydrolysis of the copolyamide from a 1:3 by weight mixture of the N-carboanhydrides of DL-leucine and epsilon-acetoxy-DL-alpha-amino-n-caproic acid*

To a solution of 0.58 part of the above copolyamide from a 1:3 by weight mixture of the N-carboanhydrides of DL-leucine and epsilon-acetoxy-DL-alpha-amino-n-caproic acid in 15.5 parts of freshly distilled m-cresol is added 7.9 parts of reagent grade methanol and a solution of 0.05 part metallic sodium in 4 parts of reagent grade methanol. The resultant mixture is heated on a steam bath under reflux for 1.5 hours, allowed to cool and 453 parts of anhydrous diethyl ether then added. This mixture is allowed to stand overnight and the insoluble material removed by filtration. After rinsing several times with anhydrous diethyl ether and slurrying three times with 50-part portions of water, there is obtained a solid polyamide from the hydrolysis of the copolyamide from a 1:3 by weight mixture of the N-carboanhydrides of DL-leucine and epsilon-acetoxy-DL-alpha-amino-n-caproic acid, i. e., a copolyamide containing units of DL-leucine, epsilon-acetoxy-DL-alpha-amino-n-caproic acid and epsilon-hydroxy-DL-alpha-amino-n-caproic acid. This copolyamide is insoluble in boiling chloroform and boiling benzene whereas the starting copolyamide, i. e., that obtained from a 1:3 by weight mixture of the N-carboanhydrides of DL-leucine and epsilon-acetoxy-DL-alpha-amino-n-caproic acid is readily soluble in both solvents. The hydrolyzed copolyamide is soluble in m-cresol and 98–100% formic acid. Solutions of the hydrolyzed copolyamide in the latter solvent, upon being poured in thin films onto a glass plate and allowing the formic acid to evaporate at room temperature, produce—after removal from the casting surface—clear, self-supporting, fairly stiff films. This copolyamide exhibits an inherent viscosity of 0.59 and contains 10.28% nitrogen (Kjehldahl). Since the theoretical nitrogen content for the unhydrolyzed copolyamide from a 1:3 by weight mixture of the N-carboanhydrides of DL-leucine and epsilon-acetoxy-DL-alpha-amino-n-caproic acid is 9.16% and that for the completely hydrolyzed copolyamide from the same mixture is 11.30%, the analytical figure indicates the hydrolysis of 52.3% of the acetoxy groups in the original copolyamide, i. e., the final partially hydrolyzed copolyamide corresponds to a 26.0/37.8/36.2 copolyamide from DL-leucine/ epsilon-hydroxy-DL-alpha - amino - n - caproic acid/epsilon-acetoxy-DL-alpha-amino-n-caproic acid.

EXAMPLE II

Part A.—Preparation of beta-acetoxy-DL-alpha-aminopropionic acid hydrochloride To 10 parts of DL-alpha-amino-beta-hydroxypropionic acid (DL-serine) dissolved in 73 parts of 98–100% formic acid is added 22.1 parts of reagent grade acetyl chloride in two equal portions over a period of five minutes during which time the temperature of the reaction mixture rises from 25 to 44° C. with vigorous evolution of gas (presumably carbon monoxide and hydrogen chloride). The reaction mixture is allowed to stand at room temperature for two hours and 226 parts of anhydrous diethyl ether added portion-wise. A light-yellow-colored oil separates which on cooling in an ice-water bath solidifies. After standing overnight, this solid material is removed by filtration. There is thus obtained after drying, 15 parts of beta-acetoxy-DL-alpha-aminopropionic acid hydrochloride (85.9% of theory) as white crystals melting at 155–158° C. with decomposition.

ANALYSIS

Calculated for $C_5H_{10}O_4NCl$: Cl, 19.34%. Found: Cl, 19.36%.

Twelve (12) parts of this above crystalline product is dissolved in 157 parts of absolute alcohol and 12 parts of pyridine then added. The white solid (5 parts) which separates is removed by filtration, and after recrystallization from a water-alcohol mixture, there is finally obtained 3 parts of beta-acetoxy-DL-alpha-aminopropionic acid as white crystals melting at 152–153° C. with decomposition. [Sakami and Toennies, J. Biol. Chem., 144, 203–17 (1942) report the melting point of "O-acetoxy-DL-serine" (believed to be the above compound) as 143–144° C. with decomposition as prepared from DL-serine and acetic anhydride in the presence of perchloric acid.]

ANALYSIS

Calculated for $C_5H_9O_4N$: C, 40.80%; H, 6.12%; N, 9.53%; N.E. (perchloric acid) 147
Found: C, 40.48%; H, 6.27%; N, 9.68%; N.E. 146.3

Beta-acetoxy-DL-alpha-aminopropionic acid hydrochloride and the free acid can be prepared in a similar fashion by the direct reaction of serine and acetyl chloride, although the product so prepared appears to be a mixture appreciably less pure than that given above.

Part B.—Preparation of the N-carboanhydride of beta-acetoxy-DL-alpha-aminopropionic acid Thirty-four (34) parts of beta-acetoxy-DL-alpha-aminopropionic acid hydrochloride (prepared as described above from DL-serine and acetyl chloride in the presence of formic acid) is suspended in 723 parts of purified anhydrous dioxane in a reactor similar to that described in Example I, Part B. Gaseous phosgene is admitted to the reaction zone for a period of 85 minutes with stirring at such a rate that an excess of phosgene is used while maintaining the reaction mixture at 40–65° C. The reaction mixture is cooled and the small portion of unreacted beta-acetoxy-DL-alpha-aminoproprionic acid hydrochloride present (three parts, representing 9% recovery) is removed by filtration. Dioxane is removed from the filtrate by distillation at 47–50° C. under 26–30 mm. of mercury pressure over a period of 97 minutes. The oily product thus obtained is taken up in 354 parts of anhydrous diethyl ether and 263 parts of petroleum ether added. The solvent mixture is decanted from the oil thus obtained and the latter then dissolved in 637 parts of boiling anhydrous diethyl ether and a small portion of insoluble material removed by filtration. Ninety-eight (98) parts of petroleum ether are then added and the solution cooled. The solid product that separates out amounting to 11.5 parts (36% yield) is removed by filtration. This product is recrystallized by dissolving in 424 parts of boiling anhydrous diethyl ether and precipitating with 59 parts of petroleum ether. There is thus finally obtained 4 parts of the pure N-carboanhydride of beta-acetoxy-DL-alpha-amino-propionic acid as white crystals which evolve gas when added to water and melt at 53–56° C.

ANALYSIS

Calculated for $C_6H_7O_5N$: C, 41.62%; H, 4.04%; N, 8.09%.
Found: C, 41.52%; H, 4.04%; N, 8.09%.

The N-carboanhydride of beta-acetoxy-DL-alpha-aminopropionic acid can also be prepared from the amino acid hydrochloride which has been prepared by reacting DL-serine with excess acetyl chloride in the same fashion as described in general in Example I, Part A. Although the yield of product is lower than that described previously, it is obtained in as good purity as white crystals analyzing for: C, 41.56%; H, 4.16%; N, 8.03% and 8.24%.

Part C.—Preparation of the polyamide from beta-acetoxy-DL-alpha-aminopropionic acid N-carboanhydride One part of the above N-carboanhydride of beta - acetoxy - DL - alpha - aminopropionic acid, dissolved in 69 parts of freshly redistilled anisole, is heated for seven days at 93° C. in a glass reactor opened to the atmosphere only through a capillary tube. During this time the polyamide precipitates as a clear yellow gel-like material. The anisole is removed from the polymerization mixture and the resulting polymer taken up in 10 parts of formic acid. After pouring this formic acid solution in a thin film onto a glass plate and removing the formic acid by heating the glass plate on a steam bath for 10 minutes, there is obtained a clear, brittle, self-supporting film of the polyamide from beta-acetoxy-DL-alpha-aminopropionic acid N-carboanhydride.

Similar results are obtained by polymerizing other samples of the same N-carboanhydride in tetrachloroethane for seven days at 93° C. and in chlorobenzene at 105° C. Temperatures in the range of at least 90° C. are apparently preferable for the polymerization of this N-carboanhydride as is demonstrated by the fact that other samples of the same N-carboanhydride give no evidence of appreciable polymerization when heated in chloroform at 50° C. for eight days.

*Part D.—Partial hydrolysis of the polyamide from beta-acetoxy-DL-alpha-aminopropionic acid*

To a solution of 1.69 parts of the polyamide from beta-acetoxy-DL-alpha-aminopropionic acid [prepared as described previously in Part C except that reagent benzene is used as the polymerization medium and a small added quantity of cyclohexylamine is used as the polymerization initiator] in 59 parts of reagent grade methanol contained in a glass reactor fitted with a reflux condenser is added a filtered solution of 0.8 part of sodium methylate dissolved in 20 parts of reagent grade methanol. The reaction mixture is heated on a steam bath at the reflux for 1.3 hours with stirring. The precipitate is then removed by filtration, washed well with methanol and dried. There is thus obtained 0.38 part of the partially hydrolyzed polyamide from beta-acetoxy - DL - alpha - aminopropionic acid as a white powder insoluble in formic acid at 100° C. and insoluble in m-cresol at the boil. Analysis indicates this polymer to contain 14.12 and 14.17% nitrogen as determined by the Dumas procedure. Since the theoretical nitrogen content for the polyamide from beta-acetoxy-DL-alpha-aminopropionic acid is 10.85% and the theoretical nitrogen content for the completely hydrolyzed polyamide from beta-acetoxy-DL-alpha-aminopropionic acid is 16.1%, these analytical figures indicate the product to be hydrolyzed to the extent of 62.9%, i. e., to correspond to a 37.1/62.9 copolyamide from beta-acetoxy-DL - alpha - aminopropionic acid/beta - hydroxy-DL-alpha-aminopropionic acid.

*Part E.—Preparation of DL-alanine/beta-acetoxy-DL-alpha-aminopropionic acid copolyamide*

A mixture of one part each of the N-carboanhydrides of DL-alanine and beta-acetoxy-DL-alpha-aminopropionic acid (prepared as described previously in Example II, Part B) is dissolved in 221 parts of purified chlorobenzene in a glass reactor opened to the atmosphere only through a capillary tube. The flask and its contents are heated at 103° C. for 112.5 hours. At the end of this time, the contents of the flask are removed and the polymer separated by filtration. After being thoroughly washed with anhydrous diethyl ether and dried, there is obtained 0.6 part of the copolyamide from a 1:1 by weight mixture of the N-carboanhydrides of DL-alanine and beta-acetoxy-DL-alpha-aminopropionic acid. A further 0.12 part of the copolyamide is obtained from the mother liquor upon evaporation. This copolyamide is soluble in m-cresol and formic acid and insoluble in dioxane at 100° C., and N,N-dimethylformamide, ethyl alcohol and chloroform all at the boil. It exhibits an inherent viscosity of 0.18.

*Part F.—Hydrolysis of the copolyamide from a 1:1 by weight mixture of the N-carboanhydrides of DL-alanine and beta-acetoxy-DL-alpha-aminopropionic acid*

To a solution of 1.09 parts of the above DL-alanine/beta - acetoxy - DL - alpha - aminopropionic acid copolyamide suspended in 59 parts of reagent grade methanol in a glass reactor is added a freshly filtered solution of 0.4 part sodium methylate dissolved in 20 parts reagent grade methanol and the reaction mixture heated on a steam bath at the reflux for 1.25 hours with stirring. The reaction mixture is filtered and the precipitate washed well with methanol and dried. There is thus obtained 0.23 part of the partially hydrolyzed copolyamide. This copolyamide is soluble in formic acid at 100° C. and in m-cresol and exhibits an inherent viscosity in m-cresol of 0.18. The copolyamide is shown by analysis (Kjeldahl procedure) to contain 16.84 and 16.96% nitrogen. Since the theoretical nitrogen content for the unhydrolyzed copolyamide from a 1:1 by weight mixture of the N-carboanhydrides of DL-alanine and beta-acetoxy-DL-alpha-aminopropionic acid is 14.85% and that for the completely hydrolyzed copolyamide from the same mixture is 18.10%, the above analytical figures indicate the hydrolysis of 63.1% of the acetoxy groups in the original copolyamide. In other words, the final partially hydrolyzed copolyamide corresponds to a 51.6/28.8/19.6 copolyamide from DL - alanine/beta - hydroxy - alpha-aminopropionic acid/beta-acetoxy-alpha-aminopropionic acid.

EXAMPLE III

*Part A.—Preparation of epsilon-formoxy-DL-alpha-amino-n-caproic acid*

Ten (10) parts of epsilon-hydroxy-DL-alpha-amino-n-caproic acid is dissolved in 73 parts of 98–100% formic acid in a reactor fitted with a motor stirrer and reflux water condenser. Reagent grade acetyl chloride (22.1 parts) is then added portion-wise over a period of 11 minutes during which time the temperature of the reaction mixture rises to 45° C. and gradually returns to room temperature with vigorous evolution of gas—presumably carbon monoxide and hydrogen chloride. The reaction mixture is now allowed to stand for one hour at room temperature and diethyl ether then added to the cloud point (approximately 150 parts). The oil which separates on standing soon crystallizes. Additional anhydrous diethyl ether (approximately 75 parts) is then added and the resulting mixture allowed to stand over-night. Upon filtration, there is obtained 12.5 parts (86.8% of theory) of epsilon-formoxy-DL-alpha-amino-n-caproic acid hydrochloride as somewhat hygroscopic crystals. After twice being recrystallized from absolute alcohol/anhydrous diethyl ether mixtures the crystals melt from 98–110° C.—such a wide range it is believed being due to the hygroscopicity of the material.

Nine (9) parts of the above epsilon-formoxy-DL-alpha-amino-n-caproic acid hydrochloride is dissolved in 47 parts of absolute alcohol and 19 parts of anhydrous pyridine added. The precipitate thus obtained is removed by filtration and after being recrystallized twice from alcohol/water mixtures, there is finally obtained 2.7 parts of purified epsilon-formoxy-DL-alpha-amino-n-caproic acid as white crystals melting at 174–177° C.

ANALYSIS

Calculated for $C_7H_{13}O_4N$: C, 48.00%; H, 7.43%; N, 8.00%; N. E. (perchloric acid) 175.

Found: C, 48.28%; H, 7.50%; N, 8.01%; N. E. 177.2.

Epsilon-formoxy-DL-alpha-amino-n-caproic acid hydrochloride can also be prepared by reacting a formic acid solution of epsilon-hydroxy-DL-alpha-amino-n-caproic acid with methyl chloroformate in a manner similar to that described previously for making the corresponding acetoxy compound using acetyl chloride. The epsilon-formoxy-DL-alpha-amino-n-caproic acid obtained therefrom through the use of pyridine as described above gives the following analysis: C, 48.01%; H, 7.43%; N, 8.09%; N. E. (perchloric acid) 175.4.

*Part B.—Preparation of epsilon-formoxy-DL-alpha-amino-n-caproic acid N-carboanhydride*

Twenty-eight (28) parts of the above epsilon-formoxy-DL-alpha-amino-n-caproic acid hydrochloride is suspended in 516 parts of purified anhydrous dioxane in a reactor such as that described previously in Example I, Part B and gaseous phosgene admitted into the reaction zone over a period of 35 minutes at such a rate that an excess of phosgene is present, while maintaining the temperature of the reaction mixture at 44–50° C. The dioxane is removed from the reaction mixture by distillation at 48–50° C. under 33–60 mm. of mercury pressure. The brown oil thus obtained is taken up in 637 parts of anhydrous diethyl ether and 536 parts of petroleum ether added and the resulting solution maintained at 0–3° C. for three days. At the end of this time the crystalline product is removed by filtration and dissolved in 453 parts of anhydrous diethyl ether. Upon cooling in an ice-water bath, there is obtained six parts of the crude N-carboanhydride of epsilon-formoxy-DL-alpha-amino-n-caproic acid. An additional 3.5 parts of the product is obtained from the original mother liquor through the addition of further 453 parts of petroleum ether. The total yield of crude product is thus 9.5 parts (corresponding to 37.4% of theory). This material is dissolved in 233 parts of boiling diethyl ether and 16 parts of petroleum ether then added. The resulting mixture is then cooled overnight at 0° C. and the crystalline material thus formed removed by filtration. There is thus obtained 5 parts of the purified N-carboanhydride of epsilon-formoxy-DL-alpha-amino-n-caproic acid as white crystals melting at 45–47° C. and slowly evolving gas from the melt at 132° C.

ANALYSIS

Calculated for $C_8H_{11}O_5N$: C, 47.76%; H, 5.47%; N, 6.96%.

Found: C, 47.99%; H, 5.73%; N, 6.95%.

*Part C.—Preparation of the polyamide from the N-carboanhydride of epsilon-formoxy-DL-alpha-amino-n-caproic acid*

One part of the above-mentioned N-carboanhydride of epsilon-formoxy-DL-alpha-amino-n-caproic acid dissolved in 52 parts of tetrachloroethane is heated at 93° C. for seven days at atmospheric pressure. At the end of this time the polymerization mixture is poured in a thin film onto a glass plate and the tetrachloroethane solvent allowed to evaporate at room temperature. Upon removal from the casting surface, there is thus obtained a clear, self-supporting film of the polyamide from the N-carboanhydride of the epsilon-formoxy-DL-alpha-amino-n-caproic acid. Temperatures in the range of at least 90° C. are preferable for the polymerization, as is evidenced by the lack of polymer formation after heating a chloroform solution of the N-carboanhydride at 50° C. for eight days.

Although in the foregoing examples certain conditions of reaction such as time, temperature, proportions, etc. have been given for the preparation of the novel N-carboanhydrides of this invention, other methods for preparing N-carboanhydrides can also be used. For instance, the N-carboanhydrides of this invention can be prepared as is disclosed in the copending application of Prichard, Serial No. 778,457, filed October 7, 1947, by treating the requisite alpha-amino acid in an anhydrous solvent with an alkali metal alkoxide and with carbon dioxide thereby forming the dialkali metal salt of the alpha-carboxyaminocarboxylic acid and reacting thionyl chloride with this salt and finally isolating the desired N-carboanhydride.

The N-carboanhydrides of this invention can also be prepared as is disclosed in the copending application of MacDonald, Serial No. 778,458, filed October 7, 1947, by reacting the necessary amino acid or its alkali metal or alkaline earth metal salts with phosgene under anhydrous conditions.

The novel N-carboanhydrides of this invention also can be prepared by the method disclosed in the copending application of Prichard, Serial No. 52,971, filed October 5, 1948, by reacting the required amnio acid or its alkali metal, alkaline earth metal, or hydrohalide salts with phosgene under anhydrous conditions in the presence of an ether, as is illustrated by the examples.

The novel N-carboanhydrides of this invention can also be prepared from the corresponding amino acids as reported by Leuchs, Ber., 39, 857 (1906), by reacting the amino acid with a chloroformate ester, isolating the ester of the N-carboxyamino acid so formed, and subsequently reacting this derivative with thionyl chloride under anhydrous conditions and isolating the desired N-carboanhydride.

The N-carboanhydrides of this invention can be prepared as described above from the corresponding acyloxy-alpha-amino acids. The latter in tur ncan be readily prepared by the methods illustrated in the previous examples from the corresponding hydroxy-alpha-amino acids and the necessary acylating agent, e. g. an acid anhydride, such as acetic anhydride, in conjunction with perchloric acid, or an acyl halide, e. g. propionyl chloride, benzoyl chloride, phenylacetylbromide. The N-carboanhydrides are preferably saturated, i. e., free from aliphatic unsaturation, i. e., the ethylenic and acetylenic type, hence the acylating agents and the hydroxyaminocarboxylic acids are preferably saturated. Because of the greater reactivity of the saturated, aliphatic acylating agents with the hydroxy-alpha-amino acids, and hence, the correspondingly greater ease of preparation of the saturated, aliphatic monocarboxylic acid esters of the hydroxy-alpha-amino acids, their corresponding N-carboanhydrides are preferred.

Hydroxy-alpha-amino acids in addition to those previously described in the examples, which can be used in preparing the N-carboanhydrides of this invention, include straight-chain, saturated, aliphatic alpha-aminohydroxy acids, e. g. threonine, allothreonine, gamma-hydroxy-alpha-aminovaleric acid, beta-hydroxy-alpha-aminonorleucine, gamma-hydroxy-alpha-aminobutyric acid, beta-hydroxynorvaline; branched-chain, saturated, aliphatic alpha-aminohydroxy acids, e. g. beta-hydroxyleucine, gamma-hydroxyleucine, beta-hydroxyvaline, beta-hydroxy-alpha-amino-alpha-methylpropionic acid, gamma-hydroxy-alpha-amino-alpha-methyl-n-valeric acid, delta-hydroxy-alpha-amino-alpha-methyl-n-valeric acid, epsilon-hydroxy-alpha-amino-alpha-methyl-n-caproic acid, and gamma-hydroxy-alpha-amino-n-heptanoic acid; and aryl-substituted-hydroxy-alpha-amino acids, e. g. beta-phenyl-beta-hydroxy-alpha-aminopropionic acid.

The present invention is generic to the N-carboanhydrides of hydrocarbon monocarboxylic acid esters of alpha-mono-primary-aminomonocarboxylic acids which are hydrocarbon except for the amino and carboxyl groups and one alcoholic hydroxyl situated on carbon separated from the carboxyl group by a saturated aliphatic chain of one to four carbons and to the polyamides derived from said N-carboanhydrides by condensation with carbon dioxide evolution and consisting of alpha-monoaminomonocarboxylic acid units 10 to 100% of which are units corresponding to alpha-mono-primary-aminomonocarboxylic acids hydrocarbon except for the amino and carboxyl groups and one alcoholic hydroxyl on carbon separated from the carboxyl by a saturated aliphatic chain of one to four carbons and esters of said hydroxy amino acids with hydrocarbon carboxylic acids.

When at least 10% of the recurring units of the polyamides of this invention are composed of residues of the above-described acyloxy-alpha-amino acids, the polyamide is more pliable and softer. It is also more soluble which allows the preparation of solutions of higher solids content in such solvents as chloroform, benzene and formic acid. The resulting solutions are more fluid and flowable—particularly advantageous properties for the use of these alpha-amino acid polyamides in the formation of films and fibers. As the proportion of units of this type of amino acid in the polymers of this invention increases, there is a corresponding increase in the above-mentioned desirable properties. This becomes particularly noticeable when the polymers contain a major proportion, i. e., more than 50% and preferably more than 65% of the above-described amino acid units.

When at least 10% of the recurring units of the polyamides of this invention are composed of the above-described hydroxyaminocarboxylic acid units, i. e., when at least 10% of the units are of the acyloxy aminocarboxylic acid type and the polyamide is completely hydrolyzed, improvements are noted in the response of the resulting polyamide to aqueous processing treatments, their dye receptivity and their resistance toward organic solvents, especially chlorinated hydrocarbons. The resulting polyamides are usually stiffer, less extensible, of higher tensile strength and of increased softening point. As the proportions of the hydroxy amino acid units in the polymers of this invention increases, there is a corresponding increase in the above-mentioned desirable properties. This becomes particularly noticeable when the polymers contain more than 30% and preferably a major proportion, i. e., more than 50% of the hydroxy amino acid units.

In the case of copolymers containing the residues of other types of alpha-monoaminomonocarboxylic acids, there will be of course additional units in the polymer chain. However, upon hydrolysis with hydrochloric acid, the polymers of this invention will yield at least one amino acid (as the hydrochloride) which is hydrocarbon except for the amino, carboxyl and one hydroxyl group situated as above described. For the best properties in films and fibers prepared from these polyamides, a degree of polymerization (DP) of greater than 50 is preferred.

Alpha-monoaminomonocarboxylic acids other than those mentioned previously whose N-carboanhydrides can be copolymerized with the novel N-carboanhydrides of this invention, include, for example, alpha-primary-monoaminoalkanoic acids, e. g. glycine, alanine, L-alanine, leucine, L-leucine, isoleucine, pseudoleucine, norleucine, valine, norvaline, alpha-amino-n-butyric acid, alpha-methyl-alpha-amino-n-butyric acid, alpha-amino-n-heptanoic acid, alpha-amino-n-octanoic acid, alpha-aminolauric acid, alpha-aminomyristic acid, alpha-aminoisobutyric acid, alpha-aminodiethylacetic acid, alpha-aminoisoamylacetic acid, 2-amino-4,6,6-trimethylheptanoic acid; cycloaliphatic-alpha-primary-monoaminomonocarboxylic acids, e. g. 1-aminocyclopentane carboxylic acid, 1-aminocyclohexanecarboxylic acid, 1-aminocycloheptanecarboxylic acid; aromatic-substituted-aliphatic-alpha-monoaminomonocarboxylic acids, e. g. beta-phenylalanine, alpha-phenylglycine, alpha-phenylalanine, and beta(m-tolyl)alanine; cycloaliphatic-substituted-aliphatic alpha-monoaminomonocarboxylic acids, e. g. alpha-aminocyclohexylacetic acid; N-aryl-substituted-alpha-secondary-monoaminomonocarboxylic acids, e. g. N-phenylglycine, N-o-tolylglycine; N-alkyl-substituted-alpha-secondary-monoaminomonocarboxylic acids, e. g. N-methylglycine, N-isopropylglycine, N-butylglycine, N-octadecylglycine, N-isopropylleucine, N-methylalanine.

The polyamides and copolyamides of this invention are prepared optionally in the presence of organic liquids by the condensation polymerization (thermal or initiated by water, alcohols, phenols, organic acids or amino-hydrogen containing amines) of the previously defined monoaminomonocarboxylic acid N-carboanhydrides with carbon dioxide evolution. Suitable organic liquids that can be used include aromatic hydrocarbons, e. g. benzene, xylene; halogenated hydrocarbons, e. g., chloroform, chlorobenzene, tetrachloroethane, carbon tetrachloride; alicyclic ketone, e. g. cyclohexanone; hydrocarbon ethers, e. g. anisole and dibutyl ether.

The N-carboanhydrides are suitably heated in a vessel adapted to permit the escaping of carbon dioxide to that temperature at which carbon dioxide begins to be evolved at an appreciable rate under the conditions of reaction. This varies with different amino acids, but it is usually in the range from 25 to 200° C. and generally within 30–50° C. of the melting point of the lowest melting N-carboanhydride present in the mixture to be polymerized. The time of the reaction can be shortened or the temperature can be lowered or both can be accomplished by the use of reaction initiators, e. g. water, alcohols, phenols, organic acids or amino hydrogen-containing amines.

The polyamides and copolyamides of this invention can be used to produce films and fibers. They also can be used in coating compositions.

The polyamides of this invention containing appreciable proportions of acyloxy substituents are characterized by a greater solubility in most organic solvents than other alpha-amino acid polyamides. In film and fiber form these polyamides are softer and possess greater elasticity and lower stick and mar temperatures. When appreciable quantities of the acyloxy groups are hydrolyzed, i. e., for the polyamides of this invention containing appreciable quantities of hydroxy-alpha-amino acid units, the polyamides exhibit greater response to aqueous processing treatments, improved dyeability, higher mar temperatures, higher moduli of elasticity and are appreciably less extensibe and stronger. Thus, by controlling the amount of acyloxy-substituted alpha-amino acid units and the degree of hydrolysis, i. e., the amount of hydroxy-substituted alpha-amino acid units, the polyamides of this invention can be prepared with a wide range of properties, ranging from highly soluble, soft, elastic materials to strong, tough, insoluble, non-extensible products. This varied range of properties easily affords the preparation from the same intermediates of alpha-amino acid polymers possessing the properties desired in general film and fiber use to any desired degree.

In the specification and claims a polymer unit $$-\text{N}-\text{R}-\text{CO}-$$

corresponds to the amino acid $$\text{HN}-\text{R}-\text{COOH}$$

in that it is the amino acid minus one molecule of water.

The foregoing detailed description has been given for clearness of understanding only and no unnecessary limitations are to be understood therefrom. The invention is not limited to the exact details shown and described for obvious modifications will occur to those skilled in the art.

What is claimed is:

1. The N-carboanhydride of an alkanoic acid ester of an alpha-primary-monoaminomonocarboxylic acid which acid is saturated aliphatic hydrocarbon except for the amino and carboxyl groups and one hydroxyl group situated on carbon separated from carboxyl by a saturated aliphatic chain.

2. The N-carboanhydride of an alkanoic acid ester of an alpha-primary-monoaminomonocarboxylic acid which acid is saturated aliphatic hydrocarbon except for the amino and carboxyl groups and one hydroxyl group situated on carbon separated from carboxyl by a saturated aliphatic chain of one to four carbons.

3. The N-carboanhydride of an alkanoic acid ester of an alpha-primary-monoaminomonocarboxylic acid which acid is hydrocarbon except for the amino and carboxyl groups and one hydroxyl group joined to the alpha-carbon by a saturated aliphatic chain of one to four carbons.

4. A high molecular weight, film- and fiber-forming, condensation polyamide consisting of alpha-monoaminomonocarboxylic acid units in peptide linkages 10 to 100% of which units are monoprimaryaminomonocarboxylic acid units, —NHRCO—, of monoprimaryaminomonocarboxylic acids which are selected from the group consisting of such acids which are hydrocarbon except for the amino and carboxyl groups and one hydroxyl group situated on carbon separated from the carboxyl by a saturated aliphatic chain of one to four carbons and hydrocarbon carboxylic acid esters thereof.

5. A high molecular weight, film- and fiber-forming, condensation polyamide, of degree of polymerization of at least 50, consisting of alpha-monoaminomonocarboxylic acid units in peptide linkages 10 to 100% of which are monoprimaryaminomonocarboxylic acid units, —NHRCO—, of monoprimaryaminomonocarboxylic acids which are selected from the group consisting of such acids which are saturated aliphatic hydrocarbon except for the amino and carboxyl groups and one hydroxyl group situated on carbon separated from the carboxyl by a saturated aliphatic chain of one to four carbons and hydrocarbon carboxylic acid esters thereof.

6. The N-carboanhydride of a hydrocarbon carboxylic acid ester of an alpha-primary-monoaminomonocarboxylic acid which is hydrocarbon except for the amino and carboxyl groups and one hydroxyl group situated on carbon separated from carboxyl by a saturated aliphatic chain.

7. A high molecular weight, film- and fiber-forming, condensation polyamide, of degree of polymerization of at least 50, consisting of alpha-monoaminomonocarboxylic acid units in peptide linkages 10 to 100% of which units are monoprimaryaminomonocarboxylic acid units, —NHRCO—, of monoprimaryaminomonocarboxylic acids which are selected from the group consisting of such acids which are hydrocarbon except for the amino and carboxyl groups and one hydroxyl group situated on carbon separated from the carboxyl by a saturated aliphatic chain and hydrocarbon carboxylic acid esters thereof.

8. A high molecular weight, film- and fiber-forming, condensation polyamide, of degree of polymerization of at least 50, consisting of alpha-monoaminomonocarboxylic acid units in peptide linkages 10 to 100% of which units are monoprimaryaminomonocarboxylic acid units, —NHRCO—, of monoprimaryaminomonocarboxylic acids which are selected from the group consisting of such acids which are hydrocarbon except for the amino and carboxyl groups and one hydroxyl group situated on carbon separated from the carboxyl by a saturated aliphatic chain and alkanoic acid esters thereof.

ROBERT NEAL MacDONALD.
CHARLES WILLIAM TULLOCK.

REFERENCES CITED

The following references are of record in the file of this patent:

UNITED STATES PATENTS

| Number | Name | Date |
|---|---|---|
| 2,279,745 | Stevenson | Apr. 14, 1942 |
| 2,534,283 | McDonald | Dec. 19, 1950 |

OTHER REFERENCES

Frankel et al.: Nature, February 5, 1949, vol. 163, pages 213 and 214.

Advances in Protein Chemistry, vol. V, 1949, Academics Press, page 143.

Richter-Spielmann: Organic Chemistry, vol. I, received Oct. 31, 1925, page 541.

Woodward et al.: Journal American Chemical Society, vol. 69, 1947, pages 1551–1552.

Advances in Protein Chemistry, vol V, 1949, pages 46 to 49 and pages 55 to 58.